(12) United States Patent
Kullberg et al.

(10) Patent No.: US 10,874,046 B2
(45) Date of Patent: Dec. 29, 2020

(54) QUICK LOADING TRIMMER HEAD AND TRIMMER THERETO

(71) Applicant: HUSQVARNA AB, Huskvarna (SE)

(72) Inventors: Stefan Kullberg, Jönköping (SE); Anders Hansson, Huskvarna (SE)

(73) Assignee: HUSQVARNA AB, Huskvarna (SE)

( * ) Notice: Subject to any disclaimer, the term of this patent is extended or adjusted under 35 U.S.C. 154(b) by 60 days.

(21) Appl. No.: 15/569,275

(22) PCT Filed: Apr. 30, 2015

(86) PCT No.: PCT/EP2015/059463
§ 371 (c)(1),
(2) Date: Oct. 25, 2017

(87) PCT Pub. No.: WO2016/173657
PCT Pub. Date: Nov. 3, 2016

(65) Prior Publication Data
US 2018/0116106 A1  May 3, 2018

(51) Int. Cl.
*A01D 34/416* (2006.01)

(52) U.S. Cl.
CPC .................. *A01D 34/4163* (2013.01)

(58) Field of Classification Search
CPC .................. A01D 34/4162; A01D 34/4163
USPC .................. 30/276, 347, 355, 356, 277.4
See application file for complete search history.

(56) References Cited

U.S. PATENT DOCUMENTS

| 4,183,138 A | * | 1/1980 | Mitchell | A01D 34/4163 30/276 |
| 4,566,189 A | * | 1/1986 | Muto | A01D 34/4162 30/276 |
| 4,702,005 A | * | 10/1987 | Pittinger, Sr. | A01D 34/4163 30/276 |

(Continued)

FOREIGN PATENT DOCUMENTS

WO   2013138752 A1   9/2013

OTHER PUBLICATIONS

International Search Report and Written Opinion for International Application No. PCT/EP2015/059463 dated Jan. 15, 2016.

(Continued)

*Primary Examiner* — Ghassem Alie
*Assistant Examiner* — Bharat C Patel
(74) *Attorney, Agent, or Firm* — Burr & Forman, LLP

(57) ABSTRACT

A hand-held cutting device (10) including an elongated member (45), a trimmer head (25), and a power unit operably coupled to the trimmer head (25) to selectively cause rotation of the trimmer head (25). The trimmer head (25) includes a line holding assembly (110, 310) to hold and selectively release trimmer line (70), and a housing to house the line holding assembly (110, 310), wherein the line holding assembly (110, 310) includes a core (140, 340), a line-release knob (160, 350), and a spool (130) configured to hold the trimmer line (70). The knob (160, 350) is axially movable with respect to the core (140, 340) between an extended first position and a retracted second position, the knob (160, 350) extending outwardly from the housing and being non-rotatably fixed to the core (140, 340) when the knob (160, 350) is in the first position.

19 Claims, 11 Drawing Sheets

(56) References Cited

U.S. PATENT DOCUMENTS

| | | | | |
|---|---|---|---|---|
| 4,959,904 A * | 10/1990 | Proulx | A01D 34/4163 | 30/276 |
| 5,020,223 A * | 6/1991 | Desent | A01D 34/4163 | 30/276 |
| 5,461,787 A * | 10/1995 | Araki | A01D 34/4162 | 30/276 |
| 5,881,465 A * | 3/1999 | Brant | A01D 34/4163 | 242/597.4 |
| 5,906,051 A * | 5/1999 | Nannen | A01D 34/4163 | 30/276 |
| 6,263,580 B1 * | 7/2001 | Stark | A01D 34/4163 | 30/276 |
| 6,457,242 B1 * | 10/2002 | Fogle | A01D 34/4166 | 30/276 |
| 6,952,877 B2 * | 10/2005 | Pfaltzgraff | A01D 34/4163 | 30/276 |
| 7,302,790 B2 | 12/2007 | Brandon | | |
| 7,624,559 B2 * | 12/2009 | Hishida | A01D 34/902 | 30/276 |
| 8,464,431 B2 * | 6/2013 | Reynolds | A01D 34/4163 | 30/276 |
| 8,707,567 B2 * | 4/2014 | Proulx | A01D 34/4165 | 30/276 |
| 9,516,807 B2 * | 12/2016 | Alliss | A01D 34/4161 | |
| 9,861,033 B2 * | 1/2018 | Skinner | A01D 34/4163 | |
| 9,924,631 B2 * | 3/2018 | Alliss | A01D 34/4161 | |
| 10,130,030 B2 * | 11/2018 | Sprungman | A01D 34/4163 | |
| 10,165,727 B2 * | 1/2019 | Cigarini | A01D 34/416 | |
| 10,334,778 B2 * | 7/2019 | Kullberg | A01D 34/416 | |
| 2013/0133208 A1 * | 5/2013 | Skinner | A01D 34/4163 | 30/347 |
| 2013/0283752 A1 * | 10/2013 | Lister | A01D 34/4165 | 56/295 |
| 2015/0327436 A1 * | 11/2015 | Skinner | A01D 34/4163 | 30/276 |
| 2016/0106034 A1 * | 4/2016 | Arnetoli | A01D 34/4166 | 30/276 |

OTHER PUBLICATIONS

Written Opinion of the International Preliminary Examining Authority for International Application No. PCT/EP2015/059463 dated Mar. 21, 2017.

International Preliminary Report on Patentability for International Application No. PCT/EP2015/059463 dated Jul. 18, 2017.

* cited by examiner

QUICK LOADING TRIMMER HEAD AND TRIMMER THERETO

TECHNICAL FIELD

Example embodiments generally relate to an outdoor power device that employs trimmer line and, more particularly, relate to a mechanism for providing relatively easy loading of trimmer line.

BACKGROUND

Handheld outdoor power devices such as trimmers, blowers, chainsaws, and/or the like, are often used to perform tasks relating to yard/grounds maintenance or even commercial resource harvesting activities that require them to be mobile. Although there are several options for powering such devices, including combustion engines, corded electric motors, or battery powered electric motors, each option may be viewed as having advantages in certain environments and for certain users.

Some trimming devices employ a trimmer line and are referred to as string trimmers. Alternatively, such devices may be known as edge trimmers, line trimmers, weed whips and/or the like. The trimmer line, which may be a monofilament line, is quite effective at cutting when rotated at high speed. Such a trimmer line is extended and held somewhat rigid by centrifugal forces while being rotated. In some cases, the trimmer line is wound upon a reel or spool and the trimmer line can be released by bumping the trimmer head, specifically its line release knob which extends downwardly therefrom, on the ground during operation. In an attempt to allow for low cutting heights and improve the ability of the user to "sweep" the trimmer head side-to-side while cutting, the extent to which the line release knob extends outwardly from the trimmer head is typically minimized. However, reducing the height of the line release knob can make it difficult to load trimmer line into the trimmer head as the user may encounter difficulty grasping and turning the knob. In contrast, as noted above, increasing the height of the knob, although facilitating loading line onto the head, limits the ability to cut at low heights and may lead to unintended "bouncing" of the trimmer head as the knob contacts the ground. Thus, operators may find it frustrating and/or difficult to replace the trimmer line and/or use the trimmer for cutting at reduced heights. Accordingly, the user experience associated with employing such devices may suffer.

BRIEF SUMMARY OF SOME EXAMPLES

Some example embodiments may therefore provide a trimmer cutting device that can accommodate a structure that is relatively quick and easy to load with trimmer line. The structure may provide a spool that is substantially fixed to prevent any substantial movement in the axial (or vertical) direction, but can move in the rotational direction responsive to operation of a power unit. As such, for example, the spool may be mated with a core having a line release knob, or "bumper" knob, that can be bumped on the ground to release line from the spool in a manner that permits the core to move in the axial (or vertical) direction, while the spool releases line but does not substantially move in the axial (or vertical direction). The structure may provide a bumper knob that is axially movable with respect to the core between a first and a second axial position to facilitate being grasped when not working.

In one example embodiment, a hand-held cutting device including an elongated member graspable along a portion thereof by an operator, a trimmer head disposed at one end of the elongated member and configured to be rotatable to perform a cutting function using trimmer line held at a portion of the trimmer head, and a power unit operably coupled to the trimmer head to selectively cause rotation of the trimmer head via turning a shaft. The trimmer head includes a line holding assembly to hold and selectively release the trimmer line, and a housing including a first housing portion and a second housing portion operably coupled to the first housing portion to house the line holding assembly, wherein the line holding assembly includes a core, a line-release knob, and a spool configured to hold the trimmer line that is operably coupled to the core. The knob is axially movable with respect to the core between an extended first position and a retracted second position, the knob extending outwardly from the housing of the trimmer head and being non-rotatably fixed to the core when the knob is in the first position with respect to the core.

In another example embodiment, a hand-held cutting device includes an elongated member graspable along a portion thereof by an operator, a trimmer head disposed at one end of the elongated member and configured to be rotatable to perform a cutting function using trimmer line held at a portion of the trimmer head, and a power unit operably coupled to the trimmer head to selectively cause rotation of the trimmer head via turning a shaft. The trimmer head includes a line holding assembly to hold and selectively release the trimmer line, and a housing operably coupled to the first housing portion to house the line holding assembly, wherein the line holding assembly includes a core, a line release knob extending outwardly from the housing, and a spool configured to hold the trimmer line that is operably coupled to the core. The knob is axially movable with respect to the core between an extended first position and a retracted second position.

In another example embodiment, a trimmer head for a hand-held cutting device includes a housing, a line holding assembly to hold and selectively release a trimmer line, the line holding assembly including a core, a line release knob, and a spool configured to hold the trimmer line that is operably coupled to the core. The knob extends outwardly from the housing, and the knob is axially movable with respect to the core between an extended first position and a retracted second position, the knob being non-rotatably fixed to the core when the knob is in first position with respect to the core.

The accompanying drawings, which are incorporated in and constitute a part of this specification, illustrate one or more embodiments of the invention and, together with the description, serve to explain the principles of the invention.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 1:
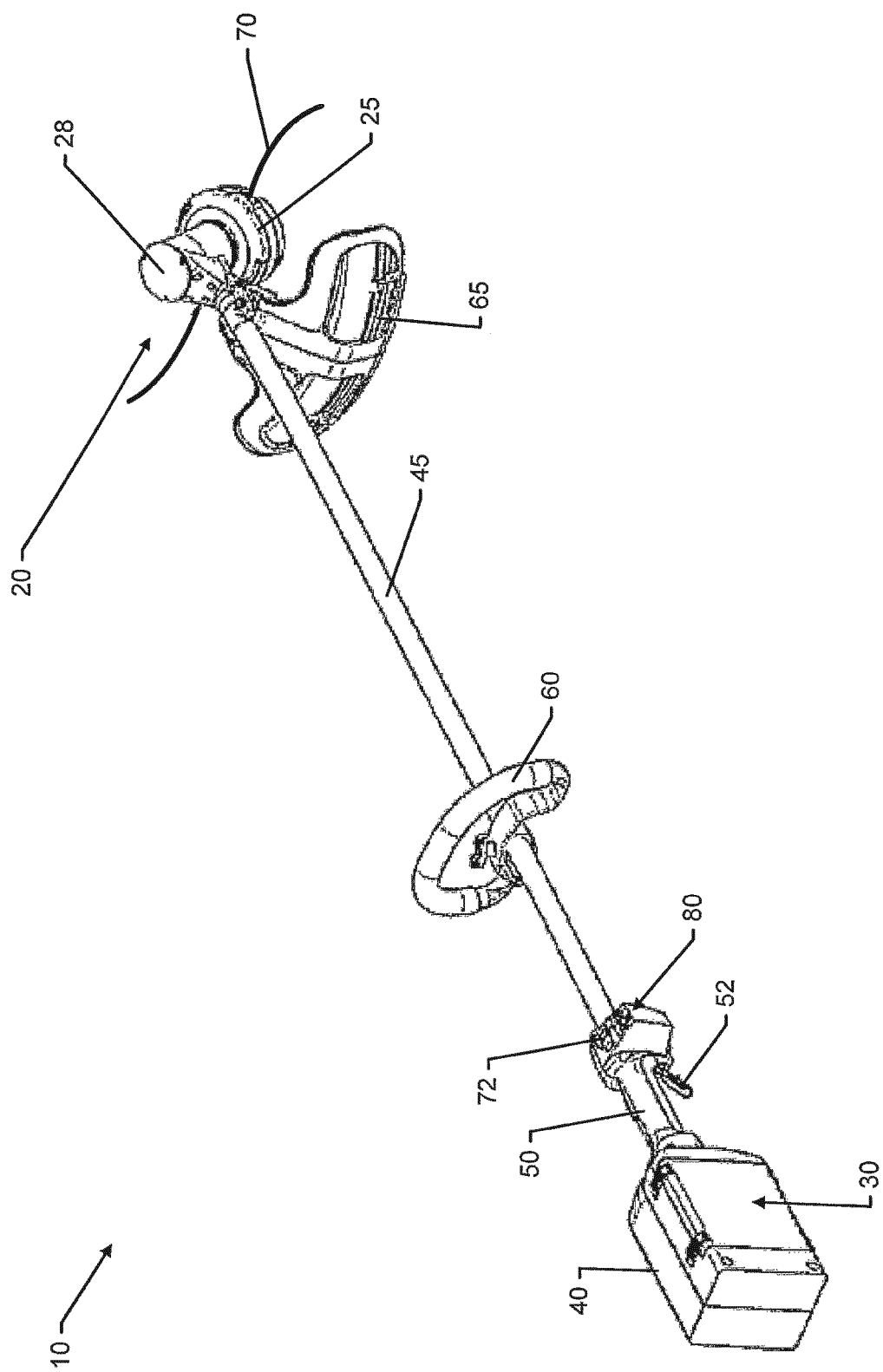
FIG. 1 illustrates a perspective view of an electric powered trimmer that may be configured in accordance with an example embodiment.

Repeat use of reference characters in the present specification and drawings is intended to represent same or analogous features or elements of the invention according to the disclosure.

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other. One of skill in the art will appreciate the normal position in which devices of example embodiments are held for operation and that the working assembly represents the front of such devices. All other directional references should be understood in this general context.

Some example embodiments described herein provide a line holding assembly that can be easily molded and assembled, and that allows an operator to quickly and easily load trimmer line onto a trimmer head. In particular, some example embodiments provide a two-piece line holding assembly in which the spool and core are separate pieces to permit easy construction. As well, in some cases, the core may be split into two pieces, specifically a core and a line release knob. The parts may then be assembled, and the resultant assembly may permit movement of the core in the axial direction (e.g., to let out more line), but may prevent movement of the spool in the axial direction. As well, the line release knob may move axially with respect to the core. Meanwhile, the core, line release knob and spool may move together for rotational movements.

Referring to the drawings, FIG. 1 shows an electric powered trimmer 10 that may be configured in accordance with an example embodiment. However, it should be appreciated that the trimmer 10 is merely one example of an electric powered, outdoor power device that may be configured in accordance with an example embodiment. However, example embodiments could alternatively be employed in connection with corded versions of various electric powered, outdoor power devices. Moreover, in some cases, example embodiments could also be practiced in connection with combustion engines that are configured to turn an output shaft. Thus, although an example embodiment will be described hereinafter with specific reference to the battery powered trimmer 10 of FIG. 1, the applicability of alternative embodiments relative to other types of devices should be well understood.

As shown in FIG. 1, the trimmer 10 may include a working implement or working assembly 20, which in this example includes a rotatable trimmer head 25. The working assembly 20 may further include a motor (e.g., an electric motor) disposed in a housing 28 of the working assembly 20. However, for petrol powered embodiments and for some electrically powered embodiments, the motor is often disposed remotely with respect to the trimmer head 25, and power is transferred to the trimmer head 25 via couplings provided in the housing 28. The motor of the trimmer 10 may be powered, according to this example, by a battery pack 30. The battery pack 30 is received into a battery compartment of the trimmer 10. It should be appreciated that the battery pack 30 and/or motor of this example form a power unit that can turn the working assembly 20. However, in other examples, the power unit may include a combustion engine or other suitable power source.

The battery compartment may be a recess or cavity formed in a casing 40 of the trimmer 10 disposed at one end of an elongated member 45 that may further include the working assembly 20 at an opposite end thereof. The elongated member 45 may be a hollow tube, pipe, rod or other such member that may be straight or curved in different embodiments. The elongated member 45 may provide operable communication between the working assembly 20 and the battery pack 30 so that the battery pack 30 can power the working assembly 20. In some embodiments, the casing 40 may be formed from one or more plastic or other rigid components that may be molded to have a desired shape. The casing 40 may substantially enclose the battery compartment, control circuitry and/or other components associated with powering and/or controlling the operation of the trimmer 10. However, it should also be appreciated that the battery pack of some alternative embodiments may be housed within a backpack that may be worn on the operator's back. In such an example, the battery pack may be connected to the trimmer 10 via a cord or other adaptor.

In an example embodiment, the trimmer 10 may include a rear handle 50 and a front handle 60. The rear handle 50 may be disposed in-line with the elongated member 45 proximate to the casing 40, while the front handle 60 may be disposed between the casing 40 and the working assembly 20 at an intermediate portion of the elongated member 45. An operator of the trimmer 10 may use one hand to hold the front handle 60 and the other hand to hold the rear handle 50 while operating the trimmer 10. In some embodiments, the rear handle 50 may include a trigger 52 or other control mechanism for engaging operation of the motor to power the working assembly 20.

Although FIG. 1 shows the front handle 60 being positioned forward of the rear handle 50 along the elongated member 45, it should also be appreciated that other arrangements for holding and operating the trimmer 10 may be provided. For example, in some cases, a "handlebar" embodiment may be provided in which the front and rear handles 60/50 are replaced by a single handle assembly attached to the elongated member 45 where both handles on the handle assembly are substantially equidistant from the working assembly 20 and disposed spaced apart from the elongated member 45 on opposites sides thereof on a handlebar assembly. Other arrangements are also possible.

The trimmer 10 may further employ a trim shield 65 that is configured to prevent cut materials and/or debris from coming back at the operator. The operator may actuate the trigger 52 to power the working assembly and turn the trimmer head 25. The trimmer head 25 may include trimmer line 70 that may extend outwardly (e.g., in a radial direction relative to a shaft forming an axis about which the trimmer head 25 rotates) from the trimmer head 25 to cut vegetation encountered thereby. The trim shield 65 may employ at least one knife element (not shown) to cut the trimmer line 70 to a length slightly less than the distance from the external periphery of the trimmer head 25 to the internal periphery of the trim shield 65 responsive to rotation of the trimmer head 25.

In an example embodiment, the motor may be a DC motor or a brushless DC motor (BLDC) that is powered by the battery pack 30. The motor may be configured to turn in either the clockwise or counterclockwise direction when a power switch 72 is powered on. In the example of FIG. 1, the power switch 72 may be provided at a control panel or control assembly 80 that may be positioned proximate to the rear handle 50. However, the control assembly 80 could be positioned at any of a number of other locations on the trimmer 10 in alternative embodiments. Moreover, it should be appreciated that petrol powered embodiments may replace the trigger 52 with a throttle and may replace the battery pack with a combustion engine. The general structure, however, of even such petrol powered embodiments may generally be similar and, as indicated above, the power unit may therefore be electric or petrol powered.

The rotation of the trimmer head 25 may cause the trimmer line 70 (which may be monofilament line) to stiffen extensively based on centrifugal forces applied to the trimmer line 70 during rotation. The faster the rotation, the stiffer the trimmer line 70 generally becomes. The trimmer line 70 can therefore make a good cutting tool for the cutting or trimming of most vegetation that is not substantially woody. However, it is typically inevitable that the trimmer line 70 will be worn during use. The wearing forces acting on the trimmer line 70 may cause the line to break, abrade or otherwise shorten in length over time. To re-extend the trimmer line 70 to full length, the trimmer head 25 may be "bumped" on the ground to release more trimmer line 70 (and cut it to length, if appropriate).

To provide sufficient additional trimmer line 70 to allow the "bump" operation to release line, the trimmer head 25 may be provided with a trimmer line spool upon which extra trimmer line 70 may be wound. However, even this spool would eventually run out of trimmer line 70 over time and need replenishment. In the past, the winding of more trimmer line 70 onto the spool has required some level of disassembly of the trimmer head 25. This disassembly and winding of trimmer line 70 can be cumbersome, and may be difficult to accomplish in a quick and easy manner. Accordingly, some example embodiments have been provided to improve the capability of the operator to easily and quickly replenish trimmer line 70 onto the trimmer head 25.

Figure 2:
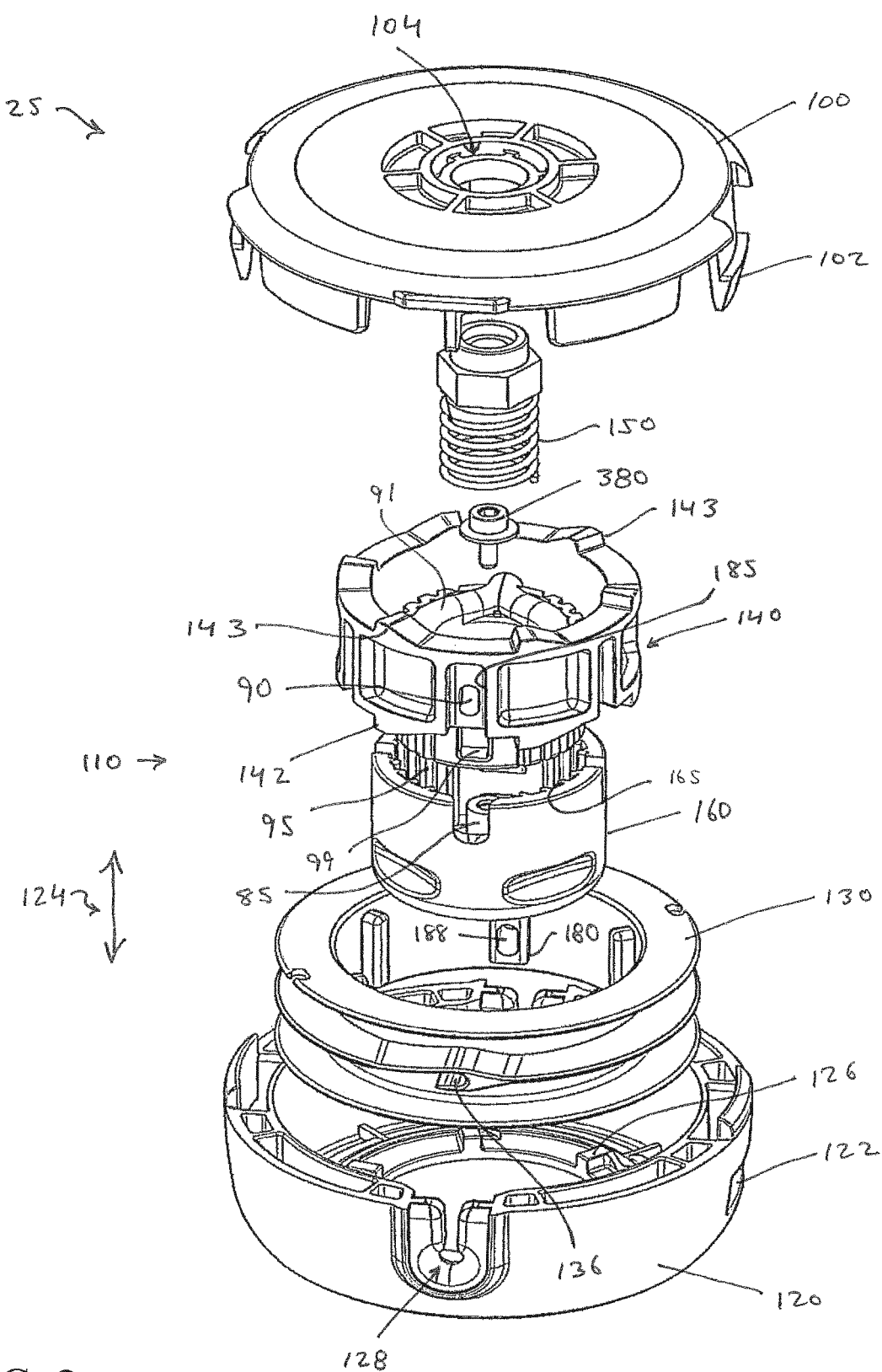
FIG. 2 illustrates an exploded perspective view of a trimmer head configured in accordance with an example embodiment from above.
Figure 3A:
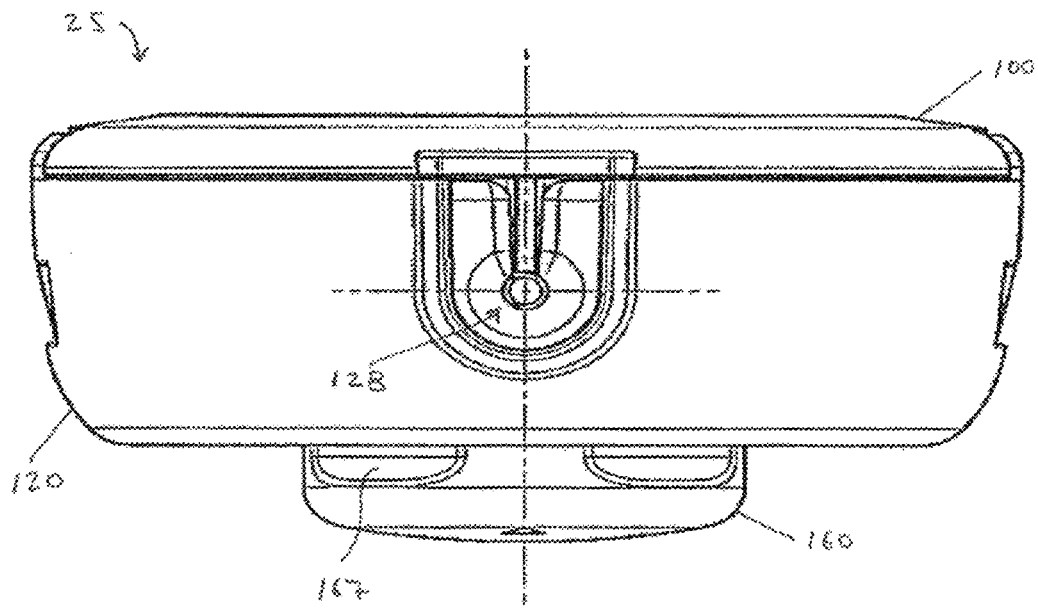
FIG. 3A illustrates a side view of the trimmer head in accordance with an example embodiment, with the line release knob in an in-use position.
Figure 3B:
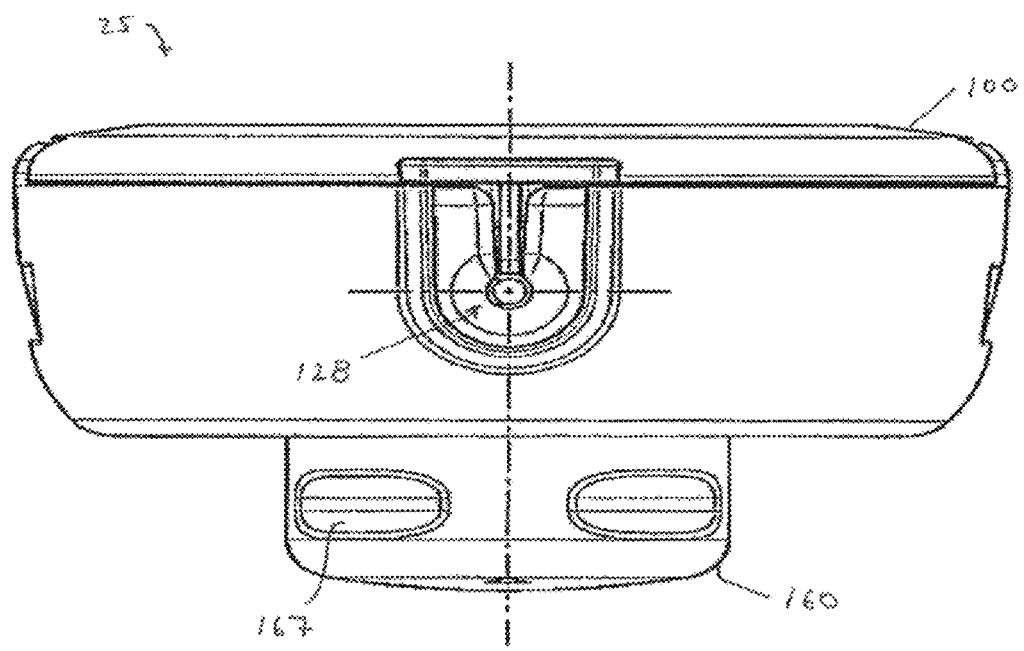
FIG. 3B illustrates a side view of the trimmer head in accordance with an example embodiment, with the line release knob in a line-loading position.
Figure 4:
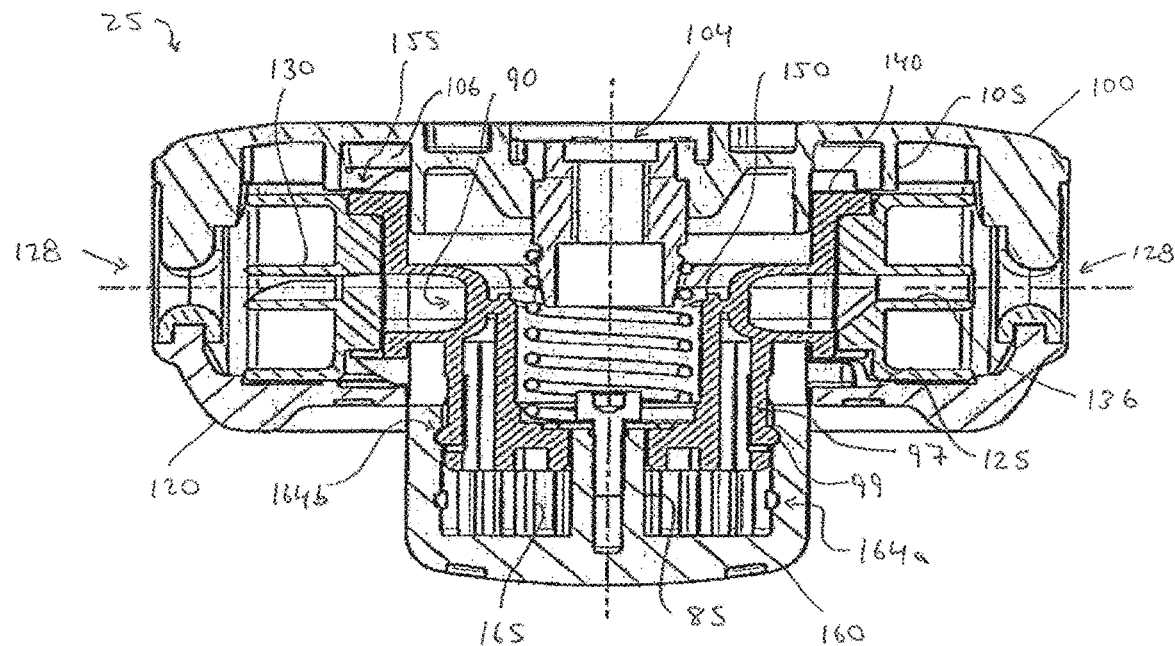
FIG. 4 illustrates a cross section view along a line that bisects a line channel with the line release knob in the line-loading position in accordance with an example embodiment.
Figure 5:
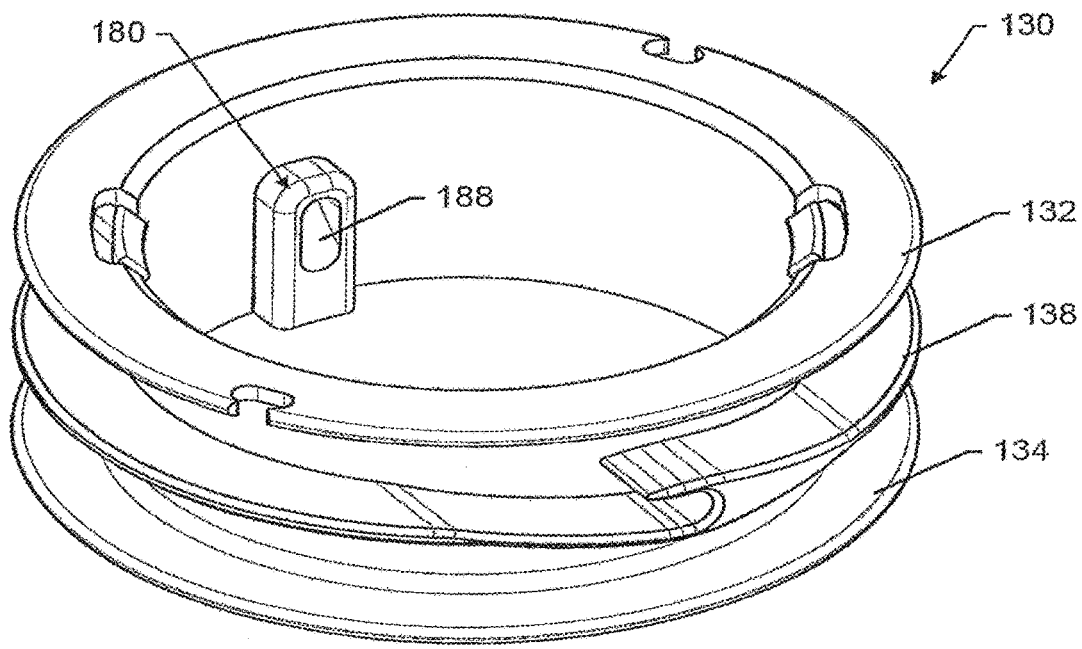
FIG. 5 illustrates a perspective view of a spool in accordance with an example embodiment.
Figure 6A:
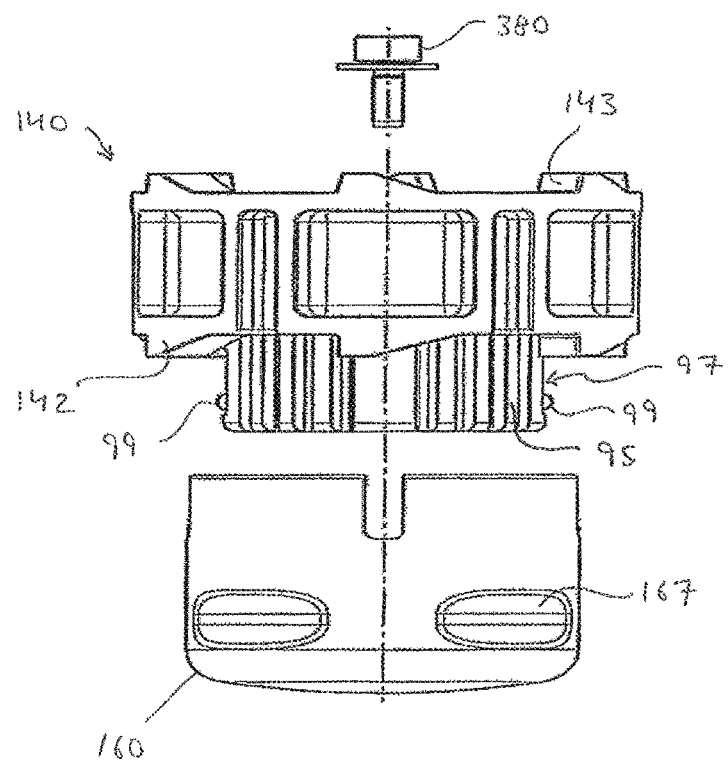
FIG. 6A illustrates a side view of a core and corresponding line release knob in accordance with an example embodiment.
Figure 6B:
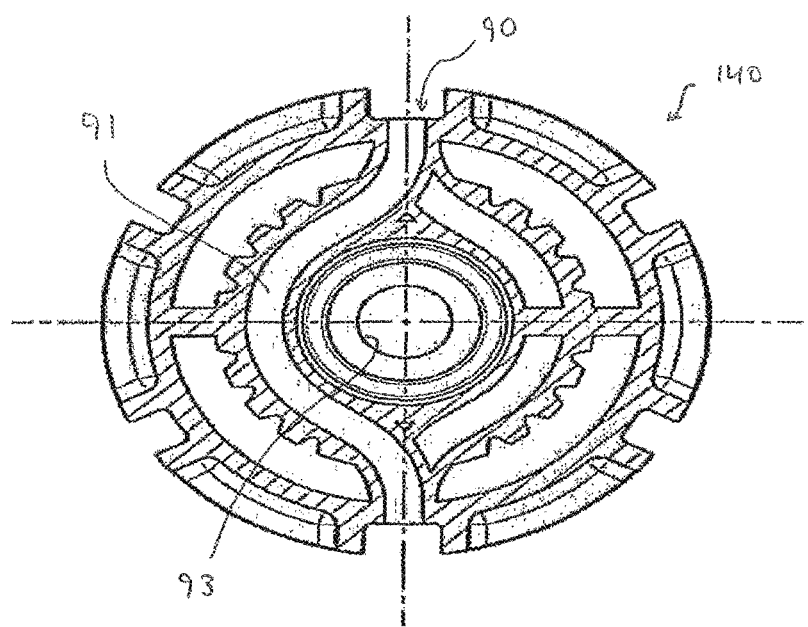
FIG. 6B illustrates a cross sectional top view of a core in accordance with an example embodiment.

FIG. 2 illustrates an exploded perspective view of the trimmer head 25 of an example embodiment from an above perspective. FIG. 3, which includes FIGS. 3A and 3B, illustrates side views of the trimmer head 25 of an example embodiment. The orientation of the trimmer head 25 in FIGS. 3A and 3B is such that the observer is looking into a line channel 90 through which trimmer line is passed prior to being wound onto a spool 130 of the device. FIG. 3A shows a bumper knob 160 of the device in a retracted, in-use, position, whereas FIG. 3B shows bumper knob 160 in an extended, line loading, position. FIG. 4 illustrates a cross sectional view taking along a line that bisects the line channel 90 in FIG. 3B. As such, FIG. 4 shows the trimmer head 25 in a line-loading position. FIG. 5 illustrates a perspective view of the spool 130 in accordance with an example embodiment, and FIG. 6, which includes FIGS. 6A and 6B, illustrates a side view and a cross sectional top view of a core 140 in accordance with an example embodiment.

As shown in FIGS. 2-6, the trimmer head 25 may include a first housing portion 100, a line holding assembly 110 to hold and selectively release trimmer line (not shown in FIG. 2-6), and a second housing portion 120. The second housing portion 120 may be operably coupled to the first housing portion 100 to house the line holding assembly 110. In an example embodiment, the first and second housing portions 100 and 120 may be snap fit together, fastened with one or more screws or other fastening members, and/or latched together. In the example of FIG. 2, the first housing portion 100 may include tabs 102 that snap fit into corresponding tab receivers 122 of the second housing portion 120. Generally speaking, the first housing portion 100 may be disposed on top of the second housing portion 120, which may be disposed on the bottom of the assembly. The terms top and bottom in this context are relative to the normal way the trimmer 10 is held with the bottom being closest to the ground.

The line holding assembly may include the spool 130 configured to hold the trimmer line and the core 140 operably coupled to the spool 130 such that rotational movement of the core 140 causes corresponding movement of the spool 130, but movement of the core in an axial direction (indicated by arrow 124) does not cause corresponding movement of the spool 130. The first housing 100 may include a coupling portion 104 that may be operably coupled to a shaft that is turned by the power unit. However, in some embodiments, the shaft may be operably coupled to the core 140. In either case, the power unit may ultimately cause the core 140 to turn and, relative to rotational movement, the core 140 may then turn the spool 130 as well.

A biasing element (e.g., spring 150) may be provided between the first housing portion 100 and the core 140 to bias the core 140 downward in the axial direction. When a "bump" operation is conducted by tapping the core 140 on the ground, the core 140 may move upward against the force of the spring 150 to enable the centrifugal force on the trimmer line during the rotation of the spool 130 relative to the second housing portion 120 to cause the spool 130 to release trimmer line. In particular, the second housing portion 120 may include one or more detents 126 that may lie in registration with one or more corresponding slide projections 142 on the core 140. Meanwhile, the first housing portion 100 may include similar detents 106 that may lie in registration with slide projections 143 disposed facing upwardly from the external periphery of the core 140. However, it should be appreciated that in alternative structures, the locations of the detents (106 and 126) and slide projections (142 and 143) could be reversed. The slide projections 142 may typically engage the detents 126 to prevent movement of the core 140 relative to the second housing portion 120 while the spring 150 pushes the slide projections 142 and the detents 126 into contact with each other. When the operator taps the core 140 on the ground, the force of the spring 150 may be overcome momentarily to enable the slide projections 142 to disengage the detents 126 and rotate the core 140 (and spool 130) relative to the second housing portion 120 to allow trimmer line to be released from the spool 130 through orifices 128 on the second housing portion 120. Meanwhile, the slide projections 143 may catch the next set of detents 106 to limit the amount of relative motion between the housings and the core 140.

As can be seen in FIG. 4, the first housing portion 100 may include spool stays 105 disposed above the spool 130. Similarly, the second housing portion 120 may include spool stays 125 to combine with the spool stays 105 on the first housing portion 100 to limit movement of the spool 130 in the axial direction. Meanwhile, the core 140 may fit inside the spool 130 and have room to move in the axial direction within a core channel 155 that is shown to have room at the top to accommodate upward movement of the core 140 in the axial direction.

Figure 8:
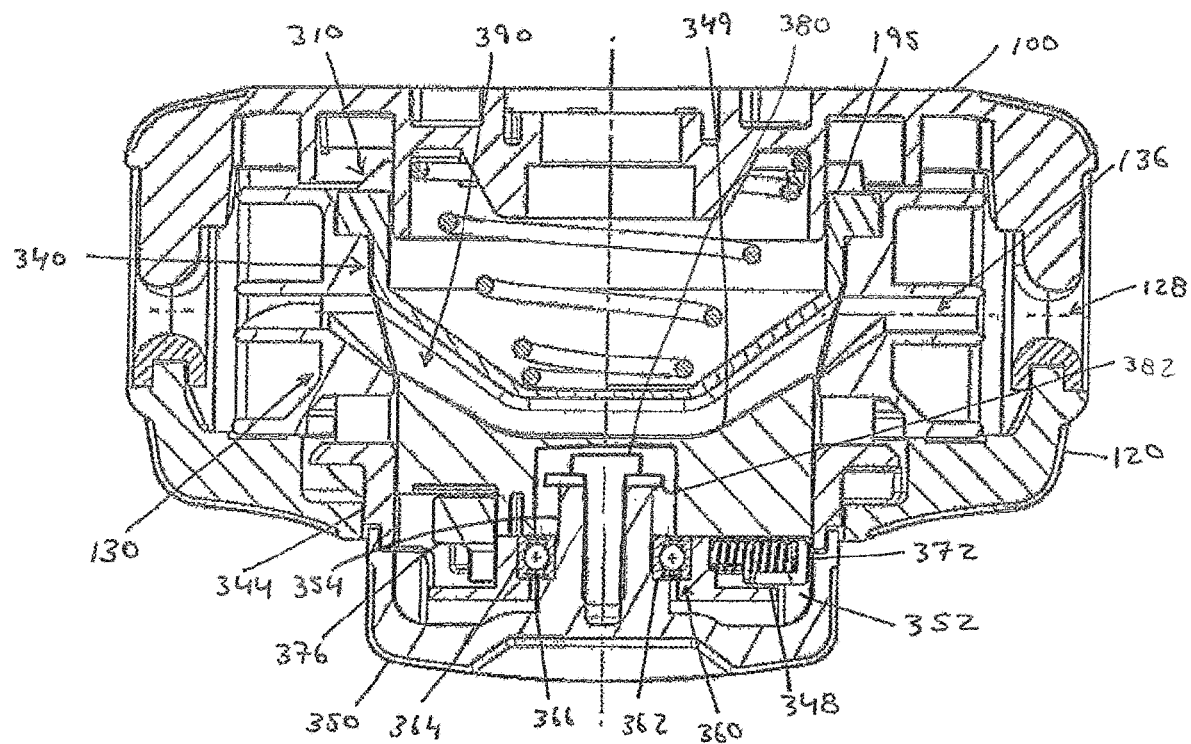
FIG. 8 illustrates a cross section view of the trimmer head in FIG. 7.

Referring specifically to FIGS. 4 and 6B, the line channel 90 may extend through the core 140 in a substantially radial direction to receive the trimmer line fed therethrough. Specifically, line channel 90 extends from one side to the other of the core 140, but includes a curved portion 91 so as to pass around a center aperture 93 formed therein. Although it should be appreciated that in some embodiments, the line channel 90 may be part of the spool 130. Regardless, as noted, the line channel 90 may include at least one curved portion 91 along a length thereof. In some cases, the curved portion may extend in the axial direction. In some cases, the line channel 90 may have a same width in the axial direction over an entirety of the line channel 90 as in the present embodiment. However, in some embodiments, the line channel 90 has a first width in the axial direction over a mid portion of the line channel 90, and the line channel may expand to a second width in the axial direction proximate to each of the opposing ends of the line channel 90, as shown in FIG. 8 and discussed below. The core 140 may have additional hollow channels (not shown) that serve to reduce the overall weight of the core 140. When the embodiment of FIG. 4 is "bumped", the core channel 155 allows the core 140 to move upward to reduce the free volume at the top of the core channel 155.

In some embodiments, the spool 130 may include a first flange 132 and a second flange 134 that extend in respective planes that are substantially parallel to each other and substantially perpendicular to the axial direction, as best seen in FIG. 5. The trimmer line extending out from opposing ends of the line channel 90 may be fed through channel portions 136 disposed to pass through the spool 130 in the radial direction. The channel portions 136 may terminate at the internal periphery of the spool 130 at respective line orifices 188. The line orifices 188 may be aligned in registration with the ends of the line channel 90. Trimmer line fed through the line channel 90, the line orifices 188 and the channel portions 136 may then be wound onto the spool between the first and second flanges 132 and 134 responsive to rotation of the core 140 about the axis of the core by the operator.

Referring additionally to FIGS. 3A and 3B, when winding trimmer line 70 onto the spool 130, the operator first grasps the grip portion 167 that are provided in the outer surface of knob 160, and pulls knob 160 downwardly from the retracted, in-use position shown in FIG. 3A to the extended, line-loading position shown in FIG. 3B. Fastener 380 is received in a post 85 that depends upwardly from the bottom of knob 160. Post 85 is axially movable within a corresponding aperture formed in core 140 so that knob 160 is movable between the in-use and line-loading positions discussed below. Preferably, one or more, in the present example two, deflectable tabs 97 are provided adjacent the bottom end of the core 140, each including an outwardly depending projection 99. Each of the projections 99 is configured to selectively engage one of two recesses 164a, 164b that are formed on the inner wall of the knob 160. The recess 164a, 164b of each pair are axially disposed along the inner surface of the knob 160 so that the knob 160 is retained in the desired position by engagement of the projections with the corresponding recess 164a, 164b of each pair. As shown, when the projections 99 engage the recesses 164a, the knob 160 is retained in the retracted position (FIG. 3A), and when the projections 99 engage the recesses 164b, as best seen in FIG. 4, the knob 160 is retained in the line-loading position (FIG. 3B). Note, the operator may grasp the grip portions 167 and manually turn the core 140 (and therefore also turn the spool 130) to wind trimmer line onto the spool 130 whether or not the knob 160 is in the extended, line-loading position. However, the ability to extend the knob 160 outwardly from the housing of the trimmer head 25 facilitates line-loading while maintaining the ability to achieve low cutting heights. Although the knob 160 is axially movable with respect to the core 140, a plurality of splines 165 formed on the inner surface of the knob 160 engages a corresponding plurality of splines 95 formed on the outer surface of the core 140 to non-rotatably fix the knob 160 thereto. Also, the spool 130 of some embodiments may also include a third flange 138 disposed between the first and second flanges 132 and 134 to divide the spool 130 into a top line receiving portion and a bottom line receiving portion. In such an example, the top line receiving portion may receive the trimmer line exiting one end of the line channel 90 and the bottom line receiving portion may receive trimmer line exiting the other end of the line channel 90.

As mentioned above, the core 140 may be movable in the axial direction to release trimmer line from the spool 130, but the spool 130 does not substantially move in the axial direction when the core 140 moves in the axial direction. Thus, although the spool 130 is affixed to the core 140 to move in registration therewith responsive to rotational movement of the core 140, the spool 130 is enabled to slide over the surface of the core 140 when the core 140 moves in the axial direction. The channel portions 136 of the spool 130 that are proximate to the ends of the line channel 90 (i.e., at location of the line orifices 188) may be wider to ensure that some portion of the channel portions 136 stays in alignment with the line channel 90 even when the core 140 moves axially (e.g., responsive to a bump operation).

To maintain the spool 130 and core 140 in registration with each other for rotational movement, while still permitting relative motion between the two in the axial direction, the spool 130 may be annularly shaped to define an inner periphery that is slightly larger than the external periphery of the core 140 (which may be generally cylindrical in shape at the area of overlap with the spool 130). The spool 130 may therefore slidably engage the outer periphery of a portion of the core 140 to permit relative movement of the core 140 in the axial direction. However, it should be appreciated that the spool 130 and the core 140 could alternatively have other shapes that are substantially matched to permit slidable engagement in the axial direction. For example, hexagonal, octagonal or other shapes may be employed. In an example embodiment, the inner periphery of the spool 130 may be provided with a vertical protrusion 180. Meanwhile, the external periphery of the core 140 may be provided with a vertical channel 185 that is slightly larger in size (but substantially similarly shaped) compared to the vertical protrusion 180. When the core 140 is bumped to move in the axial direction, the vertical protrusion 180 may be configured to ride in the vertical channel 185.

In some embodiments, the core 140, the spool 130, the knob 160, and/or the first and second housing portions 100 and 120 may be made of hard plastic or some other rigid material. Thus, in some cases, the core 140, the spool 130, the knob 160, and/or the first and second housing portions 100 and 120 may be molded components.

Figure 7:
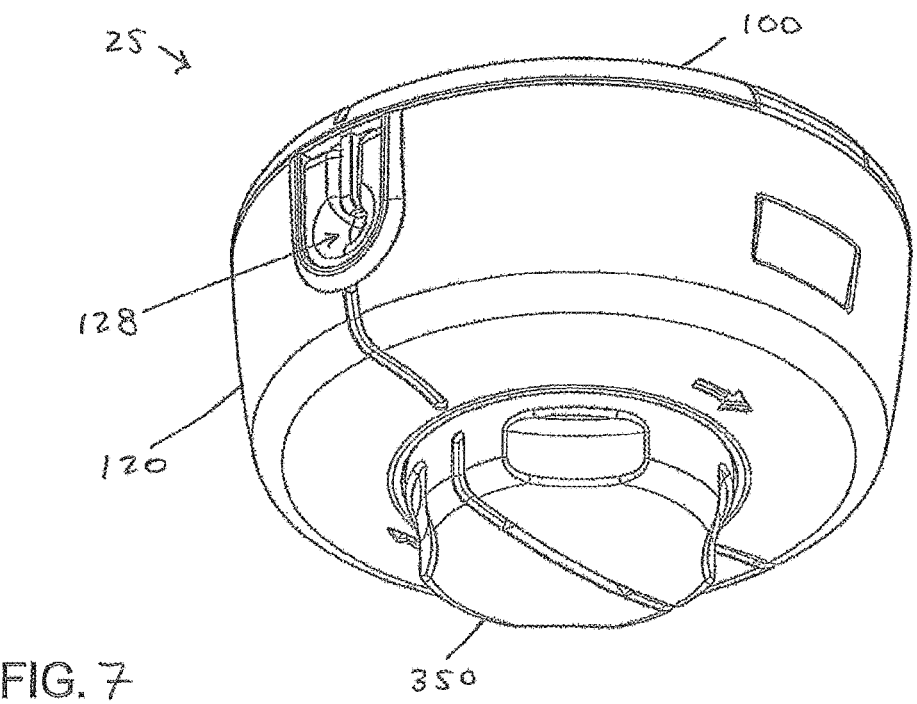
FIG. 7 illustrates a bottom perspective view of a trimmer head including an alternative line holding assembly in accordance with an example embodiment.
Figure 9:
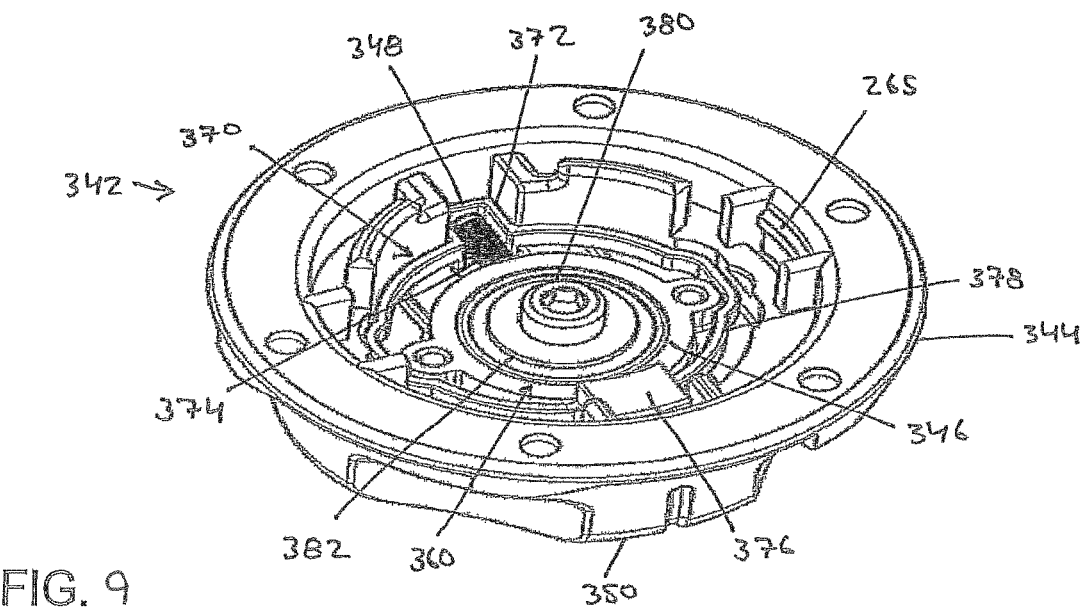
FIG. 9 illustrates an assembled perspective view of a portion of the alternative line holding assembly in accordance with an example embodiment.
Figure 10:
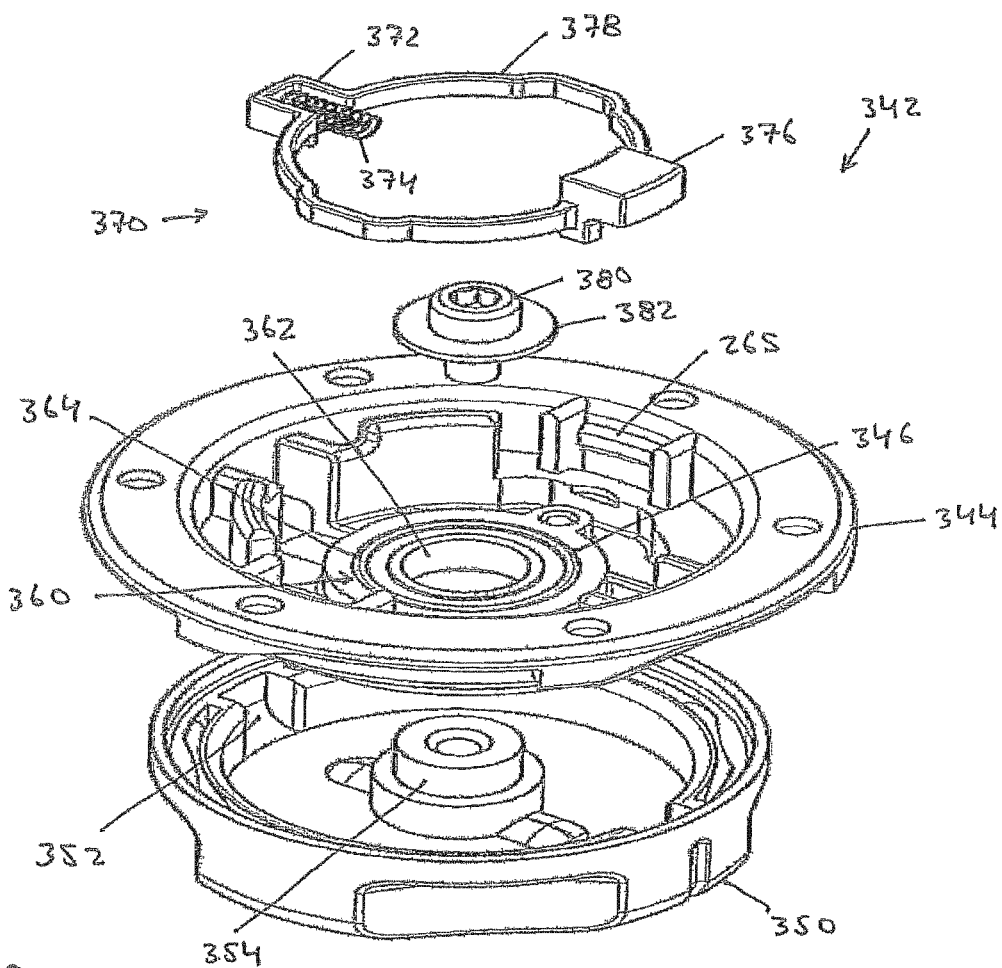
FIG. 10 illustrates an exploded perspective view of the portion of the alternative line holding assembly shown in FIG. 9.

The specific structures shown in FIGS. 2 through 6 illustrate an example embodiment. In this regard, FIGS. 7 through 10 illustrate an alternative core and/or spool structure that could be employed in some embodiment. As such, the example of FIGS. 7 through 10 represents an alternative line holding assembly 310. FIG. 7 illustrates a perspective view of a trimmer head including the alternative line holding assembly 310, and FIG. 8 is a cross-sectional view of the trimmer head and line holding assembly 310 shown in FIG. 7. FIG. 9 illustrates a top perspective view of the assembled core base 342 of a core 340 of the line holder assembly 310, and FIG. 10 illustrates an exploded perspective view of the core base 342 as shown in FIG. 9.

The line holding assembly 310 may generally be inserted into the first housing portion 100 and second housing portion 120 described above, and the operation of the line holding assembly 310 may be substantially similar to the operations described above. However, the line holding assembly 310 of this example may include a multi-piece core including a core base 342 and a core body 195, the core body 195 and the core base 342 combining to form a line channel 390. The multi-piece core facilitates manufacture of the assembly. As shown, the line holding assembly 310 employs a spool 130 as previously discussed with regard to the embodiment of FIGS. 2 through 6, but in alternate embodiments may include a spool having only two flanges and, therefore, only one line receiving portion.

As noted above, the line channel 390 may be formed by the core body 195, which defines the side walls and top of the line channel 390, and a channel base 349 of the line channel 390 that is secured to the core base 342 by fasteners (not shown) and extends upwardly therefrom. As best seen in FIGS. 9 and 10, the core base 342 includes a base plate 344 defining a central aperture 346, a locking aperture 348 defined in its sidewall, and a pair of receivers 265 that are configured to receive a corresponding pair of protrusions (not shown) that depend downwardly from core body 195 in a snap fit.

A line-release knob 350 is selectively rotatably secured to core base 342 by threaded fastener 380. A radial bearing 360 including an inner race 362, an outer race 364 and a plurality of rollers 366 is disposed between the core base 342 and the knob 350 to facilitate rotation of the knob 350 relative to the core base 342 while minimizing potential wear. Specifically, the outer race 364 of the radial bearing 360 is received adjacent the sidewall of the central aperture 346, whereas the inner race 362 is received adjacent the sidewall of an axial projection 354 that depends upwardly from the inner surface of the knob 350. A washer 382 that has a diameter that is greater than the inner diameter of the inner race 362 of the radial bearing 360 is disposed between a head of the threaded fastener 380 and the radial bearing 360, thereby securing the knob 350 to the base plate 344. As shown in FIG. 8, the axial projection 354 of the knob 350 is long enough that the washer 382 is axially spaced from the radial bearing 360 when the knob 350 is in the retracted, in-use position for cutting operations. Similarly to the previously discussed embodiment, the knob 350 is axially moveable with respect to the core 340 to an extended, line-loading position (not shown). In the extended, line-loading position, the washer 382 abuts the topside of the inner race 362 of the bearing 360, thereby limiting the extent of axial movement of the knob 350 with respect to the core 340. Preferably, a pair of projections and corresponding pairs of recesses (not shown) similar to those discussed with regard to the previous embodiment are used to retain the knob 350 in the desired position with respect to the core.

As best seen in FIGS. 9 and 10, a locking slide 370 including a locking projection 372 and a counterweight 376 is slidably disposed within the base plate 344 of the core base 342. The locking projection 372 and the counterweight 376 of the locking slide 370 extend radially outwardly from opposing portions of the substantially circular body 378 of the locking slide 370. The locking slide 370 is constrained within the base plate 344 of the core base 342 by channel base 349 for motion in the horizontal plane that is transverse to a longitudinal center axis of the trimmer head 25. More specifically, the motion of the locking slide 370 is restricted such that locking projection 372 and counterweight 376 are movable both radially inwardly and outwardly along an axis that is transverse to the longitudinal center axis of the trimmer head 25. A spring 374 exerts a radially outward biasing force on locking projection 372 such that the locking projection 372 extends radially outwardly through the locking aperture 348 of the base plate 344 when the trimmer head 25 is in the at-rest position, i.e., not rotating. A pair of lock recesses 352 is defined by the inner wall of the knob 350 and is configured to receive the locking projection 372 of the locking slide 370 therein, thereby non-rotatably fixing the knob 350 to the base plate 344 of the core base 342. Note, in the at-rest position of the trimmer head 25, the locking projection 372 is received in one of the locking projections 372 when the knob 350 is in both the retracted and extended positions. As such, the knob 350 is non-rotatably fixed to the core 340 and can be used to rotate the core 340 for line loading, as discussed below.

When the trimmer head 25 is in the at-rest position, the knob 350 is non-rotatably fixed to the core base 342, which is in turn non-rotatably secured to the core body 195 and the corresponding spool 130. As such, the knob 350 facilitates replenishment of the cutting line on the spool 130 when the trimmer head is in the at-rest position in the previously discussed manner. However, during trimming operations in which the trimmer head 25 is rotating, as the rotational speed of the trimmer head 25 increases, the counterweight 376 of the locking slide 370 begins to move radially outwardly away from the longitudinal center axis of the trimmer head 25, against the biasing force of the spring 374. As such, as the counterweight 376 moves farther radially outwardly away from the longitudinal center axis, the locking projection 372 moves radially inwardly toward the longitudinal center axis of the trimmer head 25. Eventually, the locking projection 372 is fully retracted from the corresponding lock recess 352 of the knob 350, at which point knob 350 is free to rotate in either direction with respect to the base plate 344 of the core base 342. Rotation of the knob 350 relative to the base plate 344 is facilitated by the radial bearing 360 that is disposed therebetween. In short, the knob 350 is free to rotate with respect to the trimmer head 25 during normal trimming operations, which leads to reduced wear of the knob 350 due to contact with various trimming operations, as well as line feed, or bump operations.

Figure 11:
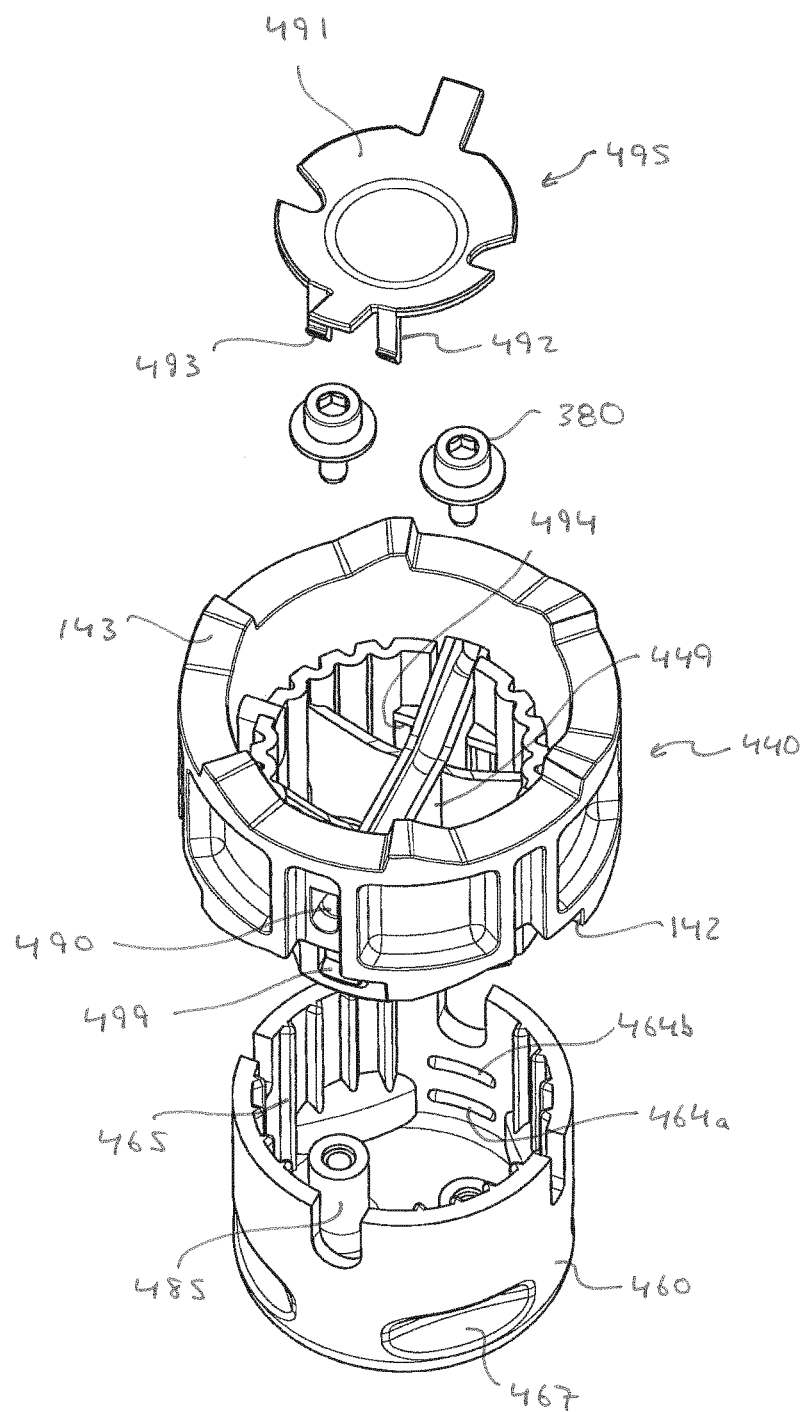
FIG. 11 illustrates an exploded perspective view of a core and line release knob in accordance with an example embodiment.
Figure 12A:
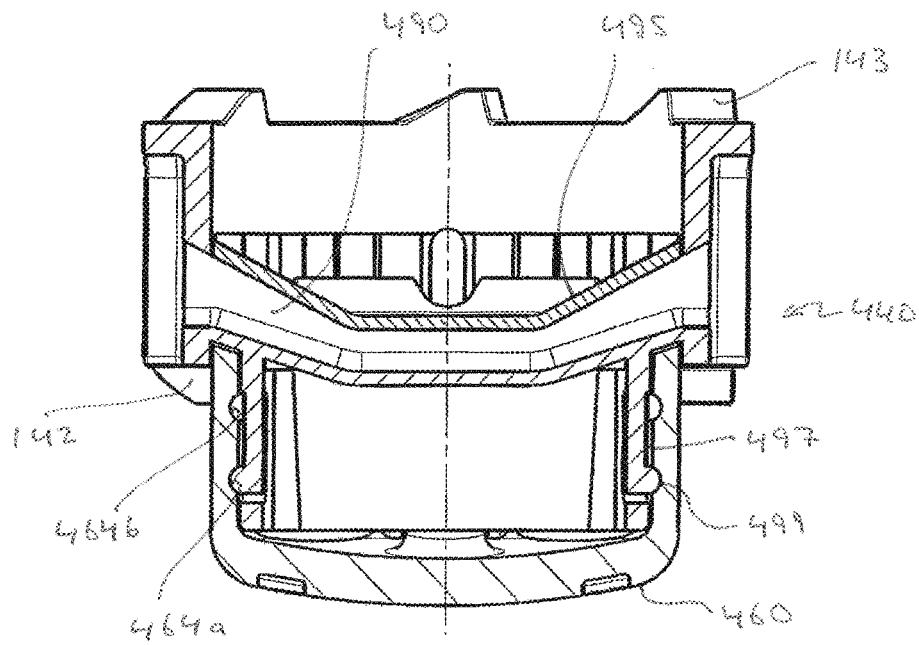
FIG. 12A illustrates a cross section view of the core and line release knob shown in FIG. 11 along a line that bisects the line channel, with the line release knob in an in-use position.
Figure 12B:
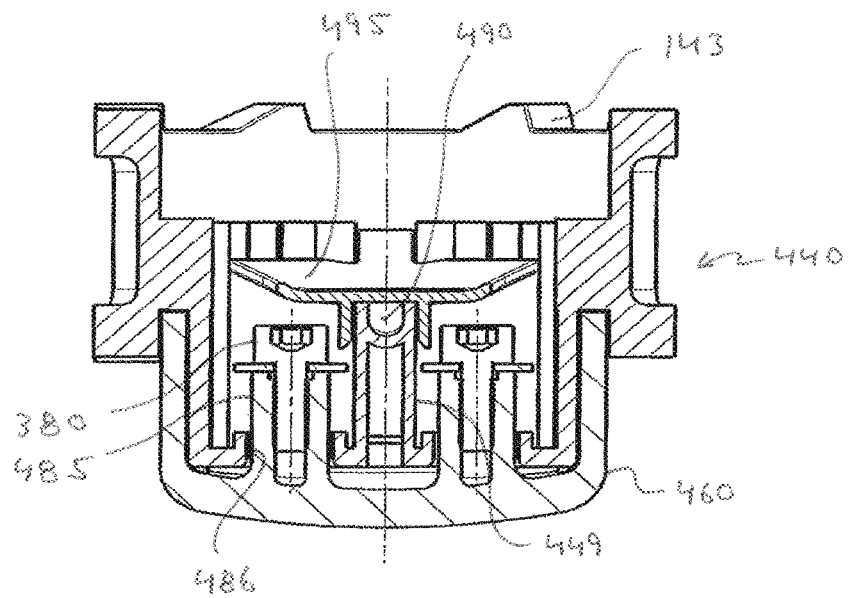
FIG. 12B illustrates a cross section view of the core and line release knob shown in FIG. 11, with the line release knob in the in-use position.

The specific structures shown in FIGS. 2 through 6 and FIGS. 7 through 10 illustrate example embodiments. In this regard, FIGS. 11, 12A and 12B illustrate an alternate core and/or knob structure that could be employed in an alternate embodiment. FIG. 7 illustrates an exploded perspective view of a core and corresponding bumper knob for use with line holding assembly 110 shown in FIG. 2, and FIGS. 12A and 12B are cross-sectional views of the core and bumper knob shown in FIG. 11, in a retracted, in-use position.

The core 440 and bumper knob 460 may generally be inserted into the previously described first housing portion 100 and second housing portion 120, and the operation of the corresponding line holding assembly 110 (FIG. 2) may be substantially similar to the operations described above. However, the present embodiment includes a multi-piece core including a core insert 495, the core insert 495 and the core 440 combining to form a line channel 490. The multi-piece core facilitates manufacture of the assembly. As shown, the core 440 and knob 460 will employ a spool 130 as previously discussed with regard to the embodiment of FIGS. 2 through 6, but in alternate embodiments may include a spool having only two flanges and, therefore, only one line receiving portion.

As noted above, the line channel 490 may be formed by the core insert 195, which defines the top of the line channel 490, and a channel base 449 of the line channel 490 extends upwardly from the bottom of the core 440 and defines the sidewalls and bottom of the line channel 490. As best seen in FIG. 11, core insert 495 includes a top plate 491 and pairs of detent legs 492 extending downwardly therefrom. Each detent leg 492 includes a projection 493 depending outwardly from its distal end for releasably engaging a corresponding recess 494 formed in the core 440.

Referring additionally to FIGS. 12A and 12B, when winding trimmer line 70 onto the spool 130 (FIG. 5), the operator first grasps the grip portions 467 that are provided in the outer surface of knob 460, and pulls knob 460 downwardly from the retracted, in-use position shown in FIG. 12A to the extended, line-loading position. A pair of fasteners 380 is received in a pair of corresponding posts 485 that depend upwardly through apertures 486 formed in the bottom of the core 440 to secure the knob 460 thereto. The posts 485 are axially slidable in the apertures 486 between the retracted and extended positions discussed herein.

Preferably, one or more, in the present example two, deflectable tabs 497 are provided adjacent the bottom end of the core 440, each including an outwardly depending projection 499. Each of the projections 499 is configured to selectively engage one of two recesses 464a, 464b that are formed on the inner wall of the knob 460. The recess 464a, 464b of each pair are axially disposed along the inner surface of the knob 460 so that the knob 460 is retained in the desired position by engagement of the projections 499 with the corresponding recess 464a, 464b of each pair. As shown, when the projections 499 engage the recesses 464a, the knob 460 is retained in the retracted position (FIG. 12A), and when the projections 499 engage the recesses 464b, as best seen in FIG. 11, the knob 460 is retained in the line-loading position. Note, the operator may grasp the grip portions 467 and manually turn the core 440 (and therefore also turn the spool 130) to wind trimmer line onto the spool 130 whether or not the knob 460 is in the extended, line-loading position. However, the ability to extend the knob 460 outwardly from the housing of the trimmer head 25 facilitates line-loading while maintaining the ability to achieve low cutting heights. Although the knob 460 is axially movable with respect to the core 440, a plurality of splines 465 formed on the inner surface of the knob 460 engages a corresponding plurality of splines (not shown) formed on the outer surface of the core 440 to non-rotatably fix the knob 460 thereto.

Figure 13:
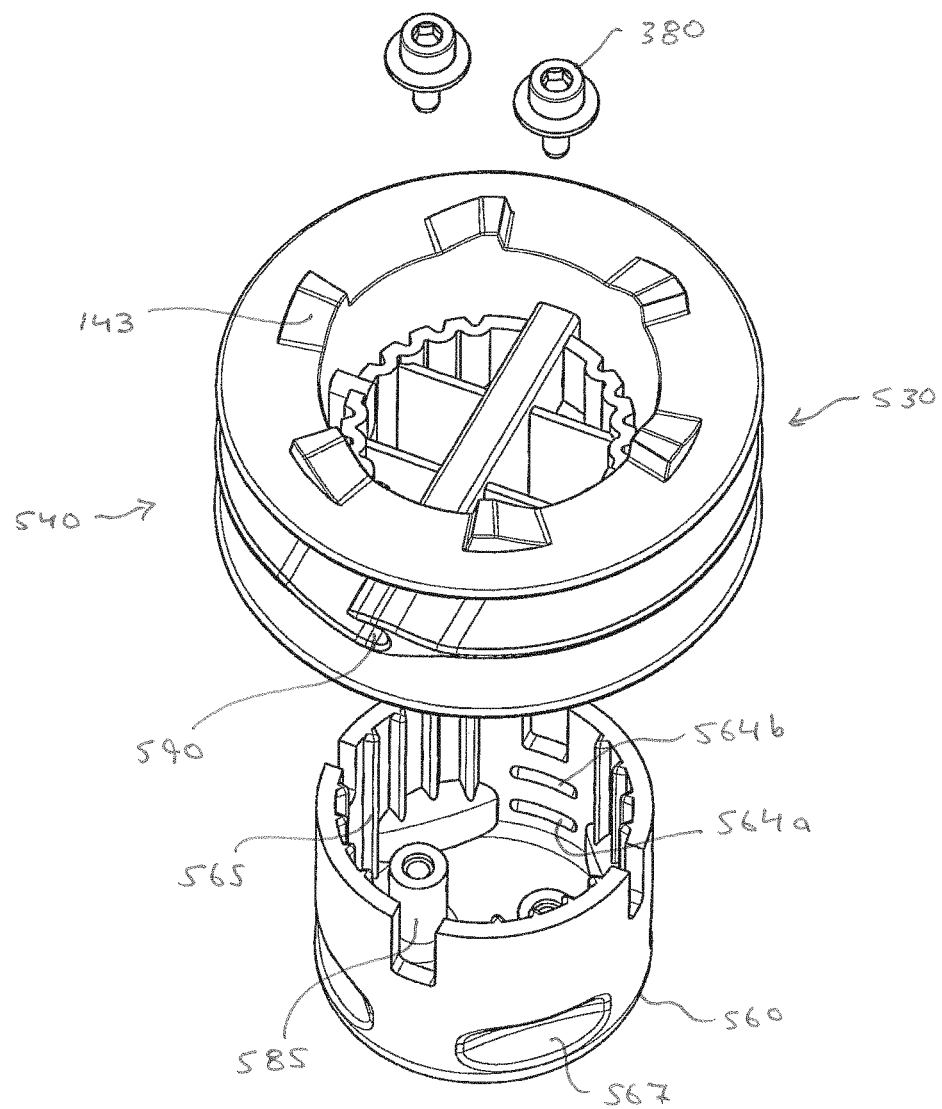
FIG. 13 illustrates an exploded perspective view of a core and line release knob in accordance with an example embodiment.
Figure 14A:
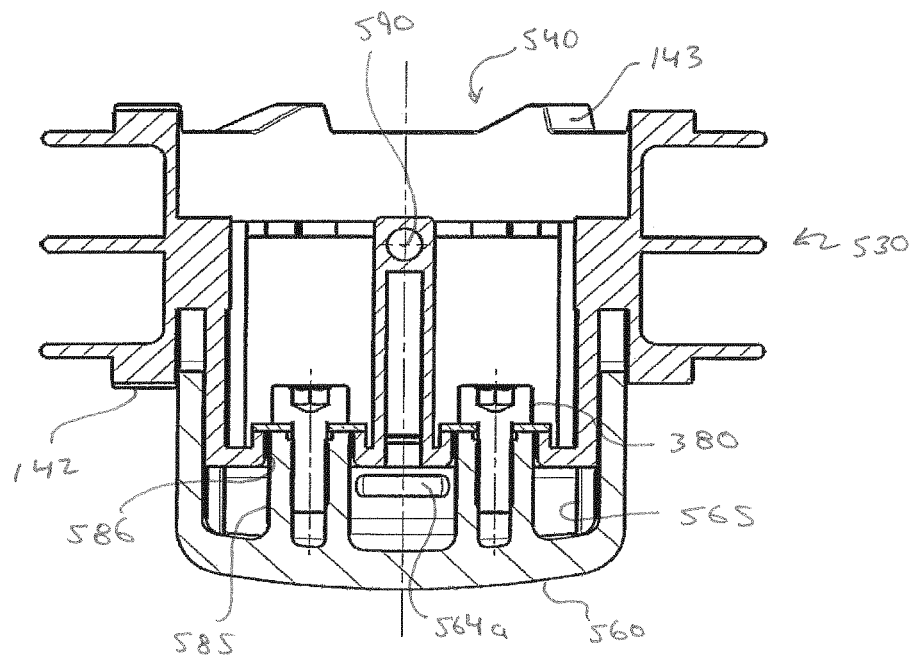
FIG. 14A illustrates a cross section view of the core and line release knob shown in FIG. 13 along a line that bisects the line channel, with the line release knob in a line-loading position.
Figure 14B:
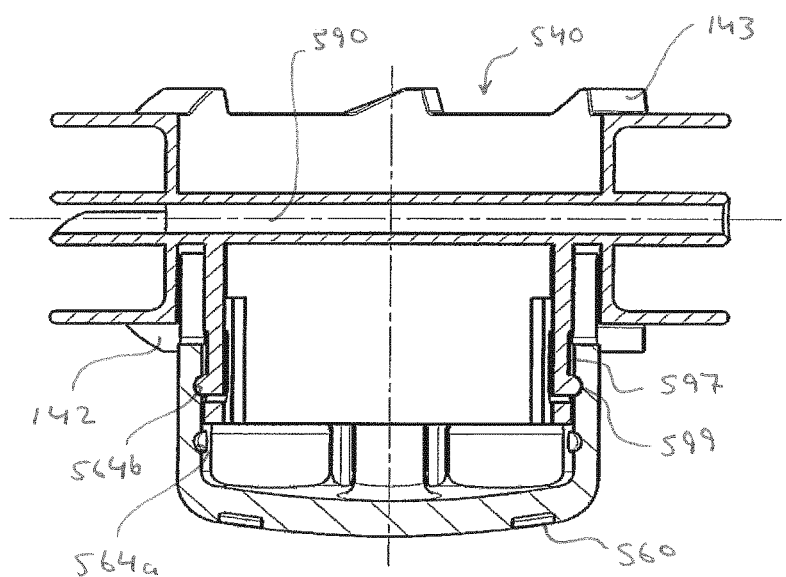
FIG. 14B illustrates a cross section view of the core and line release knob shown in FIG. 13, with the line release knob in the line-loading position.

Referring now to FIGS. 13, 14A and 14B, an alternate core and/or knob structure that can be employed in an alternate embodiment of a line holding assembly is shown. FIGS. 14A and 14B are cross-sectional views of the core and bumper knob shown in FIG. 11, in an extended, line-loading position.

The core 540 and bumper knob 560 may generally be inserted into the previously described first housing portion 100 and second housing portion 120, and the operation of the corresponding line holding assembly 110 (FIG. 2) may be substantially similar to the operations described above. However, the present embodiment differs primarily from the embodiment shown in FIG. 11 in that it includes a core that is unitarily formed with a spool portion 530. As shown, the spool portion 530 is substantially the same as spool 130 which was previously discussed with regard to the embodiment of FIGS. 2 through 6. However, in alternate embodiments the core 540 may include a spool portion having only two flanges and, therefore, only one line receiving portion. One additional difference over the embodiment shown if FIG. 11 is that the line channel 590 is of unitary construction, i.e., no core insert is required.

Referring additionally to FIGS. 14A and 14B, when winding trimmer line 70 onto the spool portion 530, the operator first grasps the grip portions 567 that are provided in the outer surface of knob 560, and pulls knob 560 downwardly from the retracted, in-use position to the extended, line-loading position shown in FIGS. 14A and 14B. A pair of fasteners 380 is received in a pair of corresponding posts 585 that depend upwardly through apertures 586 formed in the bottom of the core 540 to secure the knob 560 thereto. The posts 585 are axially slidable in the apertures 586 between the retracted and extended positions discussed herein.

Similarly to the previous embodiments, one or more, in the present example two, deflectable tabs 597 are provided adjacent the bottom end of the core 540, each including an outwardly depending projection 599. Each of the projections 599 is configured to selectively engage one of two recesses 564a, 564b that are formed on the inner wall of the knob 560. The recess 564a, 564b of each pair are axially disposed along the inner surface of the knob 560 so that the knob 560 is retained in the desired position by engagement of the projections 599 with the corresponding recess 564a, 564b of each pair. As shown, when the projections 599 engage the recesses 564a, the knob 560 is retained in the retracted position, and when the projections 599 engage the recesses 564b, the knob 560 is retained in the line-loading position (FIGS. 14A and 14B). Although the knob 560 is axially movable with respect to the core 540, a plurality of splines 565 formed on the inner surface of the knob 560 engages a corresponding plurality of splines (not shown) formed on the outer surface of the core 540 to non-rotatably fix the knob 560 thereto.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A trimmer head for a hand-held cutting device comprising:
    a housing; and
    a line holding assembly to hold and selectively release a trimmer line, the line holding assembly including:
        a core,
        a knob, and
        a spool configured to hold the trimmer line that is operably coupled to the core, the core comprising a line channel extending through the core and configured to receive trimmer line fed through the line channel,
        wherein the knob extends outwardly from the housing, wherein the knob, when assembled with the core and the spool for operation of the hand-held trimmer cutting device, is axially movable with respect to the core between an extended first position for facilitating graspability of the knob for hand turning the knob and the core via the knob during line loading and a retracted second position;
        wherein the core is operably coupled with the spool such that the core rotates with the spool;
        wherein the core is axially movable relative to the spool, when assembled with the spool for operation of the hand-held trimmer cutting device, into a line feed position where the core is disengaged from the housing to permit the trimmer line to feed out due to rotation of the spool relative to the housing, the knob being non-rotatably fixed to the core when the knob is in extended first position; wherein the knob and the core comprise corresponding recesses and projections that engage to retain the knob in the retracted second position in response to the knob being moved into the retracted second position.

2. The trimmer head of claim 1, wherein the knob is non-rotatably fixed to the core when the knob is in the second position with respect to the core.

3. A trimmer head for a hand-held cutting device comprising:
    a housing;
    a spool configured to hold trimmer line;
    a core comprising a line channel extending through the core and configured to receive trimmer line fed through the line channel; and
    a knob;
    wherein the knob is assembled with the core and the spool for operation of the hand-held trimmer cutting device to perform a trimming operation;
    wherein the knob is axially movable with respect to the core between an extended first position for facilitating graspability of the knob for hand turning the knob and the core via the knob during line loading and a retracted second position, the knob being non-rotatably fixed to the core when the knob is in extended first position;
    wherein the core is operably coupled with the spool such that the core rotates with the spool; and
    wherein the core is axially movable relative to the spool into a line feed position where the core is disengaged from the housing to permit the trimmer line to feed out due to rotation of the spool relative to the housing; wherein the knob and the core comprise corresponding recesses and projections that engage to retain the knob in the retracted second position in response to the knob being moved into the retracted second position.

4. A hand-held trimmer cutting device comprising:
    an elongated member graspable along a portion thereof by an operator;
    a trimmer head disposed at one end of the elongated member and configured to be rotatable to perform a cutting function using a trimmer line held at a portion of the trimmer head; and
    a power unit operably coupled to the trimmer head to selectively cause rotation of the trimmer head via a shaft;
    wherein the trimmer head comprises:
        a line holding assembly to hold and selectively release the trimmer line, the line holding assembly including a core, a knob, and a spool configured to hold the trimmer line, the core comprising a line channel extending through the core and configured to receive trimmer line fed through the line channel; and
        a housing including a first housing portion and a second housing portion operably coupled to the first housing portion to house the line holding assembly, wherein the knob, when assembled with the core and the spool for operation of the hand-held trimmer cutting device, is axially movable with respect to the core between an extended first position for facilitating graspability of the knob for hand turning the knob and the core via the knob during line loading and a retracted second position; and wherein the core is operably coupled with the spool such that the core rotates with the spool;

wherein the core is axially movable relative to the spool, when assembled with the spool for operation of the hand-held trimmer cutting device, into a line feed position where the core is disengaged from the housing to permit the trimmer line to feed out due to rotation of the spool relative to the housing; wherein the knob and the core comprise corresponding recesses and projections that engage to retain the knob in the retracted second position in response to the knob being moved into the retracted second position.

5. The device of claim 4, wherein, when the knob is in the extended first position, the knob extends outwardly from the housing of the trimmer head and is non-rotatably fixed to the core.

6. The device of claim 4, wherein the knob is non-rotatably fixed to the core when the knob is in the second position with respect to the core.

7. The device of claim 4, wherein the first housing portion is operably coupled to the shaft and turns responsive to operation of the power unit.

8. The device of claim 4, wherein the knob is non-rotatably fixed to the core when the trimmer head is in an at-rest state, and is rotatable with respect to the core when the trimmer head is in an in-use state and rotating.

9. The device of claim 8, wherein a radical bearing is operably disposed between the core and the knob to facilitate rotation therebetween.

10. The device of claim 9, wherein the core comprises a locking projection that is radially movable between a first radially outward position and a second radially inward position, and the knob defines a lock recess configured to receive the locking projection when the knob is disposed in the extended first position, thereby non-rotatably fixing the knob to the core.

11. The device of claim 10, wherein the locking projection extends radially outward from a first portion of a body of a locking slide that is disposed opposite a second portion of body from which a counterweight depends radially outwardly.

12. The device of claim 11, wherein a spring exerts a radially outward biasing force on on the locking projection.

13. The device of claim 12, wherein the knob is non-rotatably fixed to the core in both the extended first position and the retracted second position.

14. The hand-held trimmer cutting device of claim 4, wherein the line channel includes a curved portion of the line channel.

15. The hand-held trimmer cutting device of claim 14, wherein the curved portion of the line channel passes around a central aperture of the core.

16. The hand-held trimmer cutting device of claim 4, wherein ends of the line channel within the core align with line orifices disposed on a central opening of the spool.

17. The hand-held trimmer cutting device of claim 4, wherein the corresponding recesses comprise a first recess and a second recess and the corresponding projections comprise a first projection; wherein the knob comprises the first recess and the second recess, the first recess and the second recess being disposed on an interior wall of the knob; and wherein the core comprises the first projection that extends towards the interior wall of the knob; and wherein the first projection
is configured to engage the first recess of the knob when the knob is in the extended first position and engage the second recess of the knob when the knob is in the retracted second position.

18. The hand-held trimmer cutting device of claim 4, wherein the corresponding recesses and projections further engage to retain the knob in the extended first position in response to the knob being moved into the extended first position.

19. The hand-held trimmer cutting device of claim 4, wherein the corresponding recesses and projections engage at an interior wall of the knob to retain knob in the extended first position when moved into the first position and in the retracted second position when moved into the retracted second position.

* * * * *